Dec. 17, 1963 J. FISHER 3,114,503

RECORD SENSING DEVICES

Filed Aug. 19, 1960 3 Sheets-Sheet 1

INVENTOR.
JOHN FISHER
BY Hudson, Boughton, Williams, David & Hoffmann
ATTORNEYS

RECORD SENSING DEVICES

Filed Aug. 19, 1960 3 Sheets-Sheet 2

INVENTOR.
JOHN FISHER
BY Hudson, Boughton,
Williams, David & Hoffmann
ATTORNEYS

RECORD SENSING DEVICES

Filed Aug. 19, 1960

INVENTOR.
JOHN FISHER
BY Hudson, Boughton, Williams, David & Hoffmann
ATTORNEYS 3,114,503
RECORD SENSING DEVICES John Fisher, Cleveland, Ohio, assignor to The Warner & Swasey Company, Cleveland, Ohio, a corporation of Ohio Filed Aug. 19, 1960, Ser. No. 50,715
15 Claims. (235—61.11)

This invention relates to record sensing devices and particularly to the sensing or reading of blocks of information stored on punched tape.

In certain applications control operations are performed in accordance with information or an order represented by characters on record devices such as punched tape, which information is sensed or read by sensing means activated in response to the sensing of the characters. As an example, information has previously been stored on cards or tape in the form of characters arranged in rows and columns in particular combinations. The characters are sensed by radiant energy responsive devices which are activated in response to the reception of radiant energy which passes through the characters from a suitable source of radiant energy.

In one well known arrangement, the information is coded in binary form on punched tape by combinations of perforations and the absence of perforations and such information is sensed by a plurality of photocells responsive to light from a lamp filament passing through the perforations. The perforations and the absence of perforations are referred to as binary bits and are arranged in rows extending perpendicular to the longitudinal axis of the tape and in columns extending parallel to such axis. Each column constitutes a word comprising the particular combination of the perforations and the absence of perforations in the column. All of the words taken together form the information or complete order, and each word column may be utilized to effect a separate controlling function.

In order to read or sense the information the punched tape is moved relative to the photocells which are arranged transversely of the tape with a single cell being provided for each column.

The punched tape is moved continuously at a predetermined rate of speed relative to the photocells so that the perforations and the absence of perforations in each column are read or sensed one row at a time during movement of the tape. When a complete order has been read, the tape movement is stopped until the order is executed. Such sensing or reading is known in the art as serial reading. In certain applications, however, it may be desired to effect what is known as a block reading wherein characters, such as perforations and the absence of perforations in a number of word columns and forming a complete information or order, are read simultaneously. It is this latter type of reading with which the present invention is concerned.

In the reading or sensing of information stored on a record device it is desirable that the photocells employed to sense the information on the record be positioned relative to the light filament and relative to the record so that the photocells receive substantially equal amounts of light passing through the perforations of the tape from the filament. This is desirable to minimize errors in the reading of the information which may result by reason of unequal currents from the photocells when the cells are activated.

According to the present invention an information block reading or sensing device of improved construction is provided including a plurality of radiant energy responsive devices such as photocells for sensing characters such as perforations and the absence of perforations located along a number of rows within information blocks on a record device with the photocells arranged so as to be substantially equidistant from the radiant energy or light source. In the preferred embodiment of the invention the device includes a punched tape having a plurality of information containing blocks spaced longitudinally of the tape with each block containing a plurality of word rows consisting of perforations and the absence of perforations in predetermined combinations. Each block contains a complete information or order and the information of each block is sensed or read in its entirety while the tape is moved intermittently. The invention is applicable to the reading of characters of any suitable form such as transparent and opaque portions of a record device, and is not limited to characters comprising perforations and the absence of perforations.

In order to effect the sensing operation a plurality of photocells are arranged in rows and columns which correspond to the rows and columns appearing on the information containing blocks. Each row contains a number of photocells corresponding to the number of binary bits in each row of an information containing block on the punched tape. The photocells are arranged in the present invention so as to be substantially equidistant from the light source so that the output currents produced thereby are substantially equal.

The invention also provides a unique mounting arrangement of the photocells wherein the cells are positioned within a plurality of bores of a framework. The arrangement is such that each cell is activated only by light passing through the corresponding character or binary bit, and cannot be activated by light passing through another character intended to activate another cell.

The sensing device includes drive means for effecting movement of the punched tape relative to the photocells in an intermittent manner such that entire blocks of information stored on the tape are read or sensed one at a time. The drive means is arranged so that when a block of information on the tape has been sensed, the tape is advanced a predetermined distance to position the next block of information relative to the photocells and to the light source so that this block may be sensed.

It is therefore an object of the invention to provide a new and novel device for reading or sensing information stored on a record device.

It is a further object of the invention to provide an improved block reading device for reading or sensing entire blocks of information consisting of characters arranged in rows and columns within each of the blocks which are spaced longitudinally of a record device.

It is another object of the invention to provide an improved block reading device for reading blocks of information consisting of transparent and opaque portions arranged in rows and columns within the blocks which are spaced longitudinally of a punched tape, the device including a plurality of photocells for sensing the transparent and opaque portions and arranged in rows and columns corresponding to the rows and columns of the transparent and opaque portions within each block on the tape, and being positioned substantially equidistant from a light source which emits light to which the photocells are responsive.

It is a still further object of the invention to provide a device as defined in the preceding object including an improved arrangement for mounting the photocells relative to the light source.

It is still another object of the invention to provide a device as defined in the next preceding object including drive means for effecting intermittent movement of the tape relative to the photocells such that the blocks of information are sensed or read in their entirety one at a time.

Other objects of the invention will become apparent from the following description taken in conjunction with the accompanying drawings, in which FIG. 1 is a view in front elevation with parts removed showing a record sensing device constructed in accordance with the invention;

While the present invention is susceptible of various modifications and constructions, it is particularly advantageous in the sensing or reading of information represented by transparent and opaque portions such as perforations and the absence of perforations arranged in rows and columns within blocks which are spaced longitudinally of a punched tape. Although the invention will be described in connection with the sensing of information represented by perforations and the absence of perforations on punched tape, it is to be understood that the invention may be applied to arrangements wherein the information to be sensed is represented by characters other than perforations and the absence of perforations.

Figure 1:
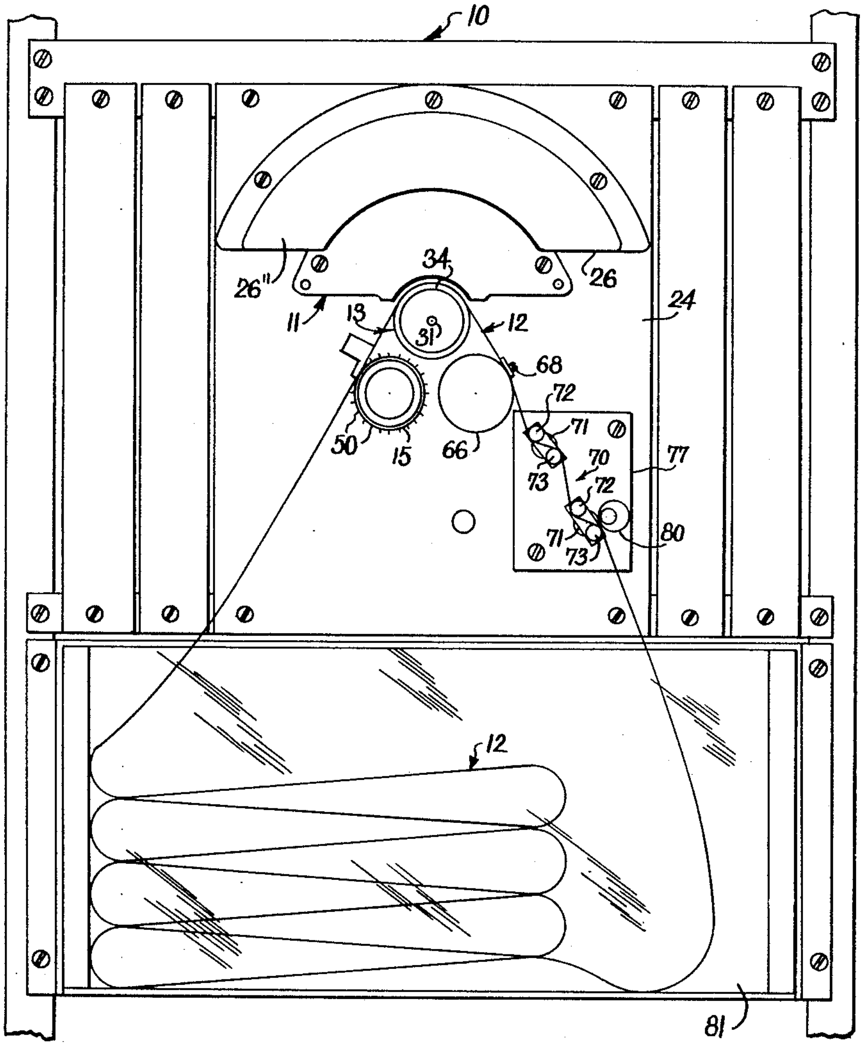
Figure 2:
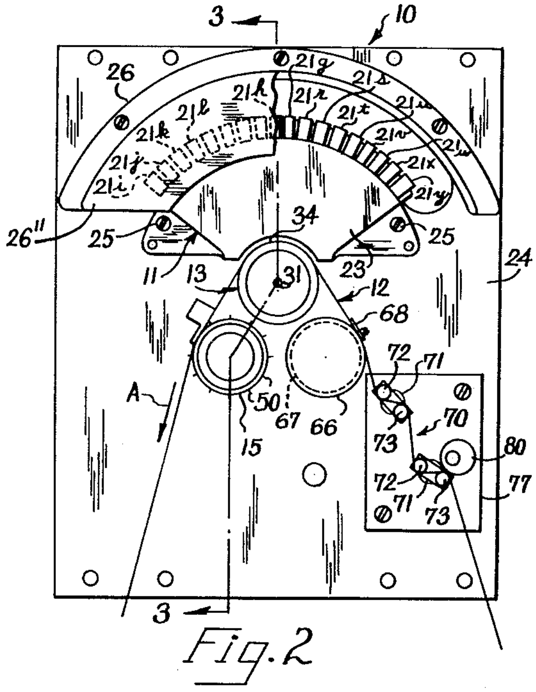
FIG. 2 is a view in front elevation of a portion of the device of FIG. 1 with parts removed and with parts broken away.
Figures 3, 4:
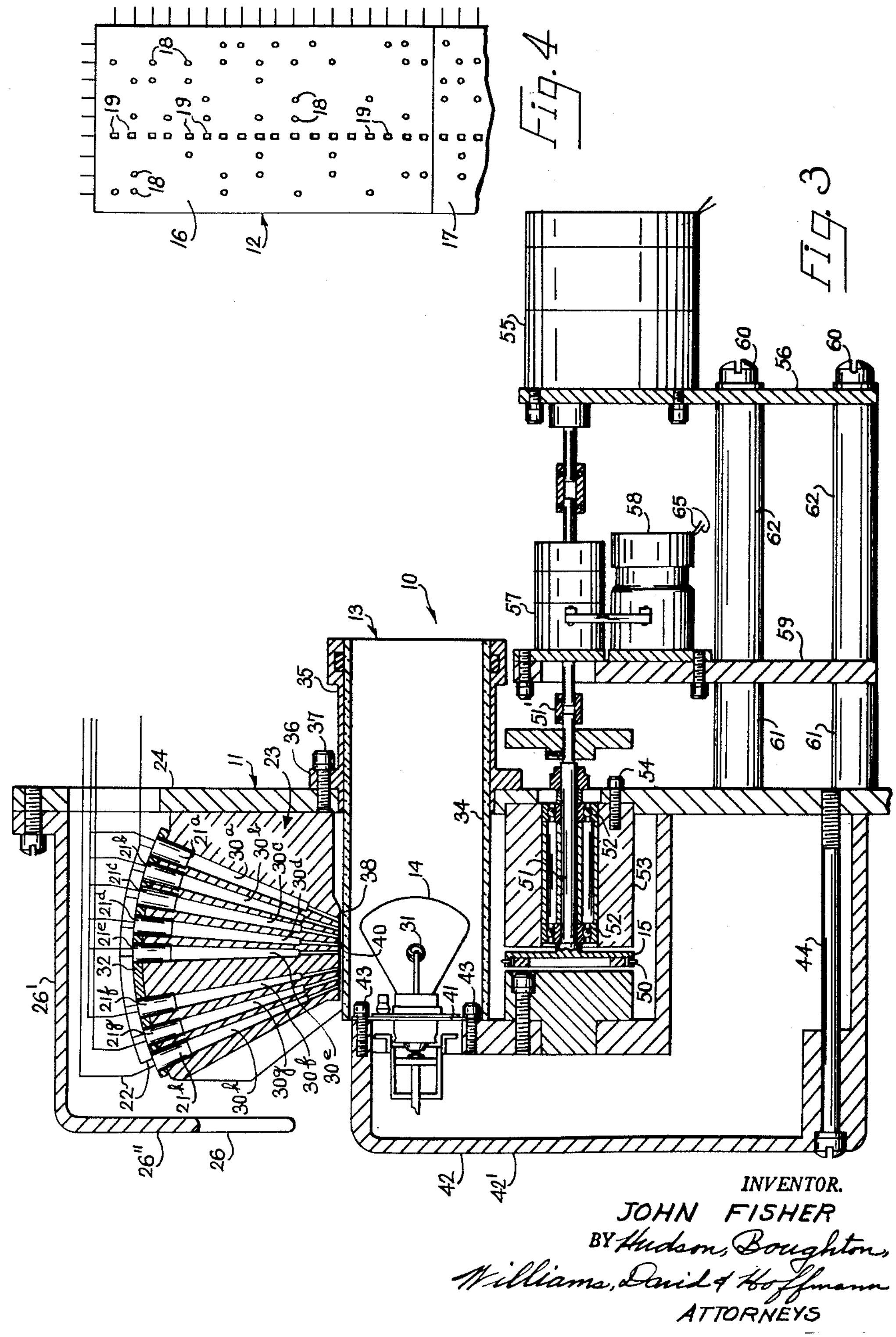
FIG. 3 is a view in section taken along the line 3—3 of FIG. 2.
FIG. 4 is a view in top plan showing a portion of the record tape utilized in the device of FIG. 1.

Referring now to the drawings the sensing device of the present invention is shown in FIGS. 1, 2 and 3 as generally designated by the numeral 10 and includes a sensing or reader unit designated generally by the numeral 11 adapted and arranged to sense or read information stored on a record device 12. The device 12 is supported by means generally designated by the numeral 13 relative to the unit 11 and relative to a suitable source of light such as an incandescent lamp 14. The record 12 is arranged to be moved relative to the unit 11 and relative to the light source 14 by drive means including a sprocket 15. The drive means is designed so that the record device is moved intermittently such that information contained within blocks on the record device may be sensed or read in their entirety one at a time.

In the illustrated embodiment the record device 12 is in the form of a punched tape and the information stored thereon is contained within a plurality of portions of the tape referred to as blocks which are spaced along the longitudinal axis of the tape. In FIG. 4 a complete block 16 of information is shown and part of an additional block 17. Each block contains a complete information or order which when sensed or read results in the performance of desired control functions in accordance with the information or order.

The information contained in each block is represented by perforations 18 and the absence of such perforations constituting binary bits and arranged in columns which extend along the longitudinal axis of the tape and in rows which are perpendicular to such longitudinal axis. The tape 12 shown in FIG. 4 includes nine columns, eight of which contain predetermined combinations of perforations and the absence of perforations. In addition, the information containing block 16 is illustrated as having eighteen rows extending perpendicular to the columns. It is understood that the number of rows and columns employed in a particular record block may be varied as desired. The first or leading rows of the blocks are spaced longitudinally of the tape by substantially equal distances so that the distances by which the tape is moved after block reading operations have been performed are substantially equal.

The combination of perforations 18 and the absence of perforations in each row may be deemed a word and each word may constitute a particular command or order for controlling apparatus which is to be operated in response to sensing of the particular word row. For example, the extreme left-hand column illustrated in FIG. 4 may constitute an order for controlling the speed of movement of a particular mechanism such as a tool supporting cross slide employed in a machine tool. As another example, one of the other columns may constitute an order for controlling the distance of movement of a cross slide. All of the word columns constitute a complete information or order for controlling speed, distance of movement, etc. of one or more mechanisms. Details of construction and operation of a record controlled system for a machine tool may be found in United States Patent No. 2,922,940.

The record tape 12 also includes a plurality of longitudinally spaced perforations 19 adapted to receive teeth of the sprocket wheel 15 to produce movement of the tape 12 relative to the reader unit 11. The wheel 15 is adapted to rotate in a counterclockwise direction as viewed in FIG. 2 to effect movement of the tape in the direction indicated by the arrow A. The arrangement employed to effect movement of the tape 12 will be described in more detail hereinafter.

Figure 5:
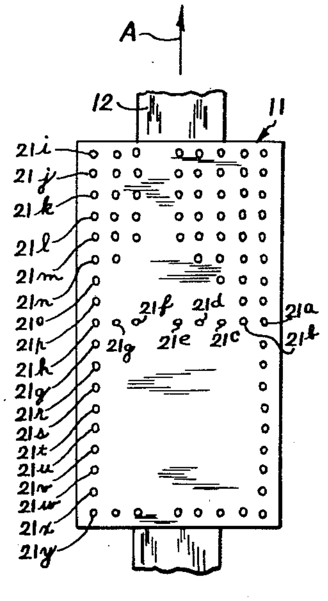
FIG. 5 is a diagrammatic view in developed form showing in top plan a portion of the record tape and the sensing device of the device of FIG. 1.
Figure 7:
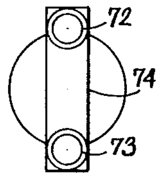
FIG. 7 is a view taken along the line 7—7 of FIG. 6.
Figure 8:
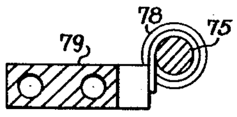
FIG. 8 is a view in section taken along the line 8—8 of FIG. 6.

The reader unit 11 includes a plurality of radiant energy responsive means illustrated in the form of a plurality of photocells responsive to light emitted from the light source 14 and passing through the perforations 18. The photocells employed may be of any conventional type and produce an output current having a magnitude dependent upon the intensity of light applied thereto. The photocells are arranged in rows and columns corresponding to the rows and columns in the information containing blocks of the tape 12. As shown in FIGS. 2, 3, and 5 eight photocells are arranged in each of eighteen arcuate rows in parallel planes and the eighteen photocells in the rows are arranged in each of eight arcuate columns in parallel planes so that the number of photocells corresponds to the number of binary bits in the rows and columns of the information blocks on the record tape. It is understood that the number of photocells utilized is dependent upon the number of binary bits in the rows and columns employed in the information blocks on the record tape and that these numbers may be varied as desired.

FIGS. 3 and 5 show the photocells corresponding to the binary bits in the ninth row from the uppermost row of the block 16 of FIG. 4 and these photocells are designated by the reference characters 21*a*–21*h*. FIGS. 2 and 5 illustrate the photocells corresponding to the binary bits in the extreme left-hand row of the block 16 and these photocells are designated by the reference characters 21*i*–21*p*, 21*h* and 21*q*–21*y*. A separate photocell is provided for each binary bit in an information containing block although all of these cells are not shown. For example, one hundred and forty-four cells are employed to read the block 16. The photocells each includes a pair of conductors 22 on which appear signals from the associated cell produced when the cell is activated by light passing through the perforations 18 from the light source 14. These conductors may be connected to control devices such as storage registers, etc. for any suitable purpose.

The photocells are mounted in a unique manner by means of a framework represented generally by the numeral 23. The framework 23 may be formed of a material such as aluminum and is secured to the front surface of a vertically extending base structure 24 which also has attached thereto a member 26 including an arcuate part 26′ which projects horizontally from the base 24 and an arcuate part 26″ which extends downwardly from the part 26′ at the front thereof to substantially enclose the framework 23.

In the present invention the photocells are positioned within a plurality of elongated bores formed in the framework 23, as best shown in FIG. 3. Each of these bores extends entirely through the framework 23 and opens at external surfaces of the framework. Each bore contains a separate photocell at its upper end and in FIG. 3 the bores 30*a*–30*h* contain respectively the photocells 21*a*–21*h*. The bores in the framework 23 are preferably cylindrical in shape and extend radially from the filament 31 of the lamp 14 which is positioned beneath the framework 23 so that the bores extend along the axes of light rays emanating from the filament 31.

The columns of bores which contain photocells corresponding to the columns of binary bits in the information blocks are spaced angularly with respect to one another by substantially equal angles with the exception of the bores 30*e* and 30*f*. As shown in FIG. 3 the bores 30*e* and 30*f* are spaced by a section 32 of the framework 23 corresponding to the row containing the sprocket receiving perforations 19 of the tape 12. The rows of bores which contain photocells which correspond to the rows of binary bits in the information blocks are spaced angularly relative to one another by substantially equal angles.

The tape support means 13 is illustrated in the form of a hollow cylinder 34 which is positioned beneath the framework 23 above and to the right of the sprocket 15 as viewed in FIG. 2, and which contains within its hollow the light source 14. The cylinder 34 in the preferred embodiment is formed of a heat resistant transparent material such as glass and is supported along a horizontal axis within a tubular sleeve 35 having a flange 36 which is attached to the right-hand or rear surface of the base 24 as by screws 37. A portion of the peripheral surface of the cylinder 34 is spaced from the lower arcuate surface 38 of the framework 23 by an arcuate gap 40 through which the tape 12 is adapted to be moved in a diretcion parallel to its longitudinal axis. The arrangement is such that when a tape is operatively positioned on the peripheral surface of the cylinder 34, approximately one-third of such peripheral surface is engaged by the tape, and the length portion of the tape which engages the peripheral surface of the cylinder 34 is substantially equal to the length of each block of information.

The lower ends of the bores formed in the framework 23 open at the surface 38 of the framework which is of arcuate configuration corresponding to the arcuate shape of the peripheral surface of the cylinder 34. The lower ends of the bores in each column are aligned along a horizontal axis and have diameters substantially equal to the perforations 18. The bores taper outwardly from their lower ends and have shoulders adjacent their upper ends against which the lower edges of the photocells bear. The dimension of clearance of the gap 40 is very small and is selected so that the perforations 18 are as close as possible to the lower ends of the bores as the tape is moved through the gap. The arrangement is such that each photocell receives light only through its corresponding perforation, and cannot receive light through a perforation corresponding to another photocell.

It is desirable that the photocells produce output signals which are substantially equal in magnitude when the cells are activated by light passing through the perforations 18 from the filament 31. In order to accomplish this the present invention provides that the photocells are arranged substantially equidistant from the filament 31 so that the photocells receive substantially the same amount of light from the filament. To this end the photocells positioned in columns corresponding to the word columns on the tape 12 are arranged so as to define arcs of a plurality of circles each having the filament 31 at their centers.

Such arrangement is shown in FIG. 2 wherein a plurality of the cells in the column corresponding to the extreme left-hand column on the tape 12 as viewed in FIG. 4 are illustrated as located substantially in an arc of a circle having the filament 31 at its center. The photocells in the remaining columns are similarly positioned in arcs. The arcs defined by the columns of photocells extend through angles of the order of one hundred and two degrees so as to encompass a complete block of information on the tape, and these arcs are, in the illustrated embodiment symmetrical with a vertically extending plane passing through the filament 31. The photocells which are positioned in rows corresponding to the rows on the tape 12 are similarly positioned in arcs of circles having the filament 31 at their center. In other words, the rows and columns of photocells lie substantially in a portion of the surface of a sphere which has the filament 31 at its center. With the described arrangement all of the photocells are substantially equidistant from the filament 31 and consequently will receive substantially the same amount of light therefrom and will produce substantially equal output signals.

The lamp 14 includes a base 41 which is secured to a frame 42 as by screws 43, which frame includes a vertically extending portion 42′ at the front of the device and which is attached to the base 24 by studs 44. The lamp 14 is energized from a suitable source of voltage (not shown).

In order to effect movement of the tape 12 relative to the reader unit 11 the sprocket wheel 15 includes teeth 50 spaced about its periphery to successively engage the perforations 19 of the tape in response to rotation of the sprocket wheel. The sprocket wheel is attached to a horizontally extending shaft 51 which is positioned beneath the cylinder 34 and which extends parallel thereto. For a purpose appearing hereinafter, the wheel 15 is preferably fixed to the shaft 51, and a coupling 51′ is provided so that the shaft 51 and wheel 15 can be adjusted in relation to clutch 57. The shaft 51 is journalled in spaced bearings 52 carried by a block 53 attached as by screws 54 to the base 24. The shaft 51 and the sprocket wheel 15 are rotated by means of a rotary motor 55 which preferably is a constant speed electrical motor and which is mounted on a vertically extending bracket 56. The motor 55 and the shaft 51 are drivingly connected by a clutch 57 controlled by an electrically energizable solenoid 58. The clutch 57 and solenoid 58 are supported by a vertically extending bracket 59. The brackets 56 and 59 are mounted by studs 60 which pass through spacers 61 between the base 24 and the bracket 59 and through spacers 62 between the bracket 59 and the bracket 56.

The arrangement is such that when the conductors 65 of the solenoid 58 are energized, the clutch 57 is actuated so that the shaft 51 is drivingly connected to the motor 55 and is rotated through a predetermined angular distance. The conductors 65 have pulses applied thereto periodically and the clutch is designed so that it is actuated each time the solenoid is pulsed, and the shaft 51 is rotated through approximately one-third of a revolution to advance the tape a distance equivalent to the length of one block of information. When the tape has been so advanced, the clutch is disengaged and rotation of the shaft 51 stops.

The tape 12 is guided during its movement by means of a fixed cylindrical guide 66 shown in FIG. 2 as positioned at the entrance side of the reader unit beneath the cylinder 34 and offset to the right thereof. The guide 66 includes a peripheral groove 67 within which a portion of the tape 12 is located such that displacement of the tape in a direction transverse to its longitudinal axis is prevented. An indicator device 68 is associated with the guide 66 to permit an operator to detect the position of a block of information on the tape. This arrangement allows an operator to determine whether or not an information block is properly positioned on the periphery of the cylinder 34 relative to the reader unit.

In order to assure that the tape 12 will be moved relative to the reader unit in the desired manner by operation of the drive means tape tensioning means are provided in advance of the guide 66 as illustrated in FIG. 2. The tensioning means is generally designated by the numeral 70 and includes a pair of tensioning devices 71 of substantially identical construction, which devices are spaced from each other in a direction generally parallel to the longitudinal axis of the tape.

Figure 6:
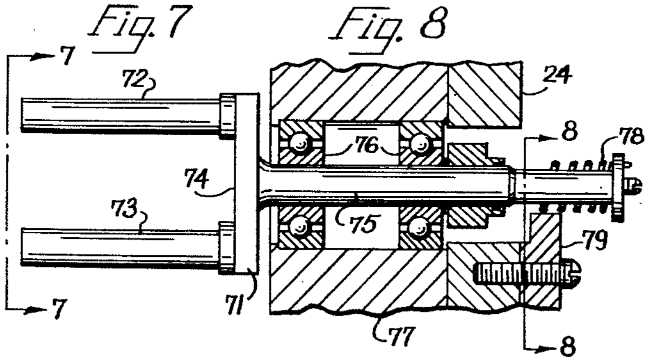
FIG. 6 is a fragmentary view in side elevation with parts shown in section of a tape tensioning device employed in the device of FIG. 1.

Details of construction of one of the devices 71 are illustrated in FIG. 6. Each of the devices 71 includes a pair of pins 72 and 73 extending parallel to each other in directions perpendicular to the longitudinal axis of the tape. The pins 72 and 73 are rotatably supported by a plate 74 which is secured to a shaft 75 rotatably mounted by spaced bearings 76 carried by a frame 77 which is secured to the base 24. The shaft 75 projects through an opening of the base 24 and the right-hand end of the shaft 75, as viewed in FIG. 6, has secured thereto one end of a helical spring 78 which surrounds the right-hand end of the shaft and which has its other end attached to an extension 79 of the base 24.

The arrangement is such that the spring 78 normally biases the shaft 75 and the plate 74 in a counterclockwise direction as viewed in FIG. 2. The tape is shown in FIG. 2 as positioned with respect to the devices 71 such that the tape passes under the pin 72 and over the pin 73 of each of the devices 71. The tape then passes downwardly into a storage bin 81 shown in FIG. 1 wherein the tape is folded upon itself such that portions of the tape are in vertically stacked relation.

The upper one of the devices 71 acts as the tape tensioner and the lower one of the devices 71 serves as a brake. The brake device 71 has associated therewith an eccentric cam 80 which is adjacent the pin 73 and which is mounted for adjustment about an axis extending parallel to the axes of the pins 72 and 73. The tape extends between the cam 80 and the pin 73 of device 71. In operation, when the tape is stationary the devices 71 are in their positions illustrated in FIG. 2. For this condition the tape is held under tension by the sprocket 15, by the tension device 71 which is urged in a counterclockwise direction by action of its spring 78 and by the braking action on the tape exerted by the cam 80 and the associated pin 73.

When the sprocket 15 is rotated movement of the tape is initially resisted by the braking action afforded by the brake device 71 and the cam 80. This results in a clockwise rotation of the tensioning device 71 against the action of its spring 78. Continued rotation of the sprocket causes the brake device 71 to move in a clockwise direction whereby the braking action is reduced to allow movement of the tape in the desired path. When the sprocket 15 is stopped the brake device 71 rotates in a counterclockwise direction by the action of its spring 78 to effect the braking action. This action is followed by counterclockwise rotation of the tensioning device 71 under the action of its spring 78 to tension the tape. The tensioning effect of the tensioning device 71 is adjustable by adjustment of the tension of its spring 78, and counterclockwise movement of the tensioning device 71 is limited by a pin (not shown). The braking action may be varied by adjusting the tension of the spring 78 associated with the braking device 71, and by adjusting the cam 80.

In operation, a record tape 12 having the desired blocks of information thereon is positioned as illustrated in FIG. 2 with a portion of the tape engaging the peripheral surface of the cylinder 34 and with one or more of the teeth of the sprocket 50 extending into one or more of the perforations 19. The tape is also positioned with respect to the tensioning means 70 in the desired arrangement and the device 71 is adjusted to provide the desired tensioning of the tape.

The tape is next located such that an entire block of information spans the portion of the tape which engages the cylinder 34. Such locating of the tape may be effected by unlocking the shaft 51 from the clutch 57 by means of adjusting the coupling 51' to shift the tape.

The motor 55 is then energized and the conductors 65 of the solenoid 58 are energized by the application of pulses thereto to effect counterclockwise rotation of wheel 15 and the intermittent movement of the tape in the direction of the arrow A relative to the reader unit. The pulsing of the solenoid 58 is effected subsequent to the elapse of a predetermined time interval from the previous pulsing which time interval is sufficient to permit advancement of the tape and to allow a proper reading operation to be performed by the reader unit while the tape is stationary. If desired, the pulsing of the solenoid 58 may be effected automatically by any suitable arrangement. The design is such that the sprocket 15 is rotated through an angle of the order of one hundred and twenty degrees each time the solenoid 58 is pulsed.

Although the invention has been described with reference to certain specific embodiments thereof, numerous modifications are possible and it is desired to cover all modifications falling within the spirit and scope of the appended claims.

Having described my invention, I claim:

1. In a record sensing device for reading blocks of information representing a complete unit of information and represented by characters arranged on a record device in longitudinally extending rows and columns perpendicular to the rows within the blocks, a source of radiant energy, a reader unit including a plurality of radiant energy responsive devices responsive to radiant energy from said source, there being one device for each character of the block, said devices being arranged so that a plurality of said devices are in each of a plurality of rows and columns corresponding to the rows and columns within said blocks and are positioned substantially equidistant from said source, and means for effecting relative movement between said reader unit and a record device in a manner such that the information containing blocks are successively positioned relative to the source and to said devices to be read by said reader unit one block at a time.

2. A device as defined in claim 1 wherein said last-named means includes drive means for effecting intermittent movement of said record device relative to said reader unit.

3. In a record sensing device for reading blocks of information representing a complete unit of information and represented by transparent and opaque portions arranged on a record device in longitudinally extending columns and rows perpendicular to the columns within the blocks which are spaced longitudinally of the record device, a light source, a reader unit including a plurality of photosensitive devices responsive to light from said source, there being one device for each character of the block, said photosensitive devices being arranged so that a plurality of said devices are in each of a plurality of rows and columns corresponding to the rows and columns within said blocks and are positioned substantially equidistant from said light source, means for supporting a record relative to said light source and to said photosensitive devices, and means for effecting relative movement between said reader unit and a supported record in a manner such that the information containing blocks are successively positioned relative to the light source and to the photosensitive devices to be read by said reader unit one block at a time.

4. A device as defined in claim 3 wherein said last-named means includes drive means for effecting intermittent movement of a supported record relative to said reader unit.

5. A device as defined in claim 3 wherein said reader unit includes a framework having a plurality of bores extending radially from said light source, said photosensitive devices being positioned within said bores substantially equidistant from said light source.

6. In a record reading device for reading blocks of information representing a complete unit of information and represented by transparent and opaque portions arranged on a record tape in longitudinally extending columns and rows perpendicular to the columns within the blocks which are spaced longitudinally of the record tape, a light source, a reader unit including a plurality of photosensitive devices responsive to light from said source, there being one device for each character of the block, said photosensitive devices being arranged so that a plurality of said devices are in each of a plurality of rows and columns corresponding to the rows and columns within said blocks and are positioned substantially in a portion of the surface of a sphere having said light source at its center, tubular means for supporting a portion of a record tape in an arcuate configuration relative to said light source and to said photosensitive devices, and means for effecting intermittent relative movement between said reader unit and a supported record tape so that the information containing blocks are successively positioned relative to the light source and to the photosensitive devices to be read by said reader unit one at a time.

7. A device as defined in claim 6 wherein said reader unit comprises a framework having a plurality of bores extending radially from said light source, said photosensitive devices being positioned within said bores substantially equidistant from said light source.

8. A device as defined in claim 6 wherein said last-named means includes a sprocket for engaging openings in a record tape, and drive means including a solenoid operated clutch for intermittently rotating said sprocket through a predetermined angular distance so that a record tape engaged by the sprocket is moved a distance equal to the length of an information containing block.

9. In a record reading device for reading blocks of information representing a complete unit of information and represented by transparent and opaque portions arranged on a record tape in longitudinally extending columns and rows perpendicular to the columns within the blocks which are spaced longitudinally of a record tape, a light source, a reader unit including a plurality of photosensitive devices responsive to light from said source, said photosensitive devices being arranged so that a plurality of said devices are in each of a plurality of arcuate rows and columns with the number of devices in each arcuate row and column being equal to the number of transparent and opaque portions in the corresponding row and column of each block on the record tape, said arcuate rows and columns constituting arcs of a plurality of concentric and perpendicular circles having said light source at the common center, a hollow transparent cylinder containing said light source within its hollow and being adapted to support a portion of a record tape in an arcuate configuration on its periphery, and means for effecting intermittent movement of a record tape supported by said cylinder relative to said reader unit in a direction parallel to the longitudinal axis of the tape so that the information containing blocks are successively positioned relative to the light source and to the photosensitive devices to be read by the photosensitive devices one block at a time.

10. A device as defined in claim 9 wherein said reader unit comprises a framework having a plurality of bores extending radially from said light source, said photosensitive devices being positioned within said bores substantially equidistant from said light source, said bores having ends opening at an arcuate surface of said framework which arcuate surface is spaced from the periphery of said cylinder by an arcuate gap through which the record tape is moved.

11. A device as defined in claim 9 wherein said last-named means includes a sprocket for engaging openings in a record tape, and drive means including a solenoid operated clutch for intermittently rotating said sprocket through a predetermined angular distance so that a record tape engaged by the sprocket is moved a distance equal to the length of an information containing block.

12. In a record reading device for reading blocks of information representing a complete unit of information and represented by transparent and opaque portions arranged on a record tape in columns and rows within the blocks which are spaced longitudinally of a record tape, a light source, a reader unit including a framework having a plurality of bores opening at opposing surfaces of the framework and radiating from said light source, said bores being arranged in a plurality of rows and columns with the number of bores in each row and column being equal to the number of transparent and opaque portions in the corresponding row and column of each block on a record tape, said bores lying in a plurality of angularly spaced and perpendicular planes each intersecting said light source, a plurality of photosensitive devices each positioned within a separate one of said bores to close the open ends of the bores which are remote from the light source, said photosensitive devices being positioned substantially equidistant from said light source, a hollow transparent cylinder containing said light source within its hollow and being adapted to support a portion of a record tape in an arcuate configuration on its periphery, the end of said bores which are nearer said light source than said remote ends opening at an arcuate surface of the framework which arcuate surface is spaced from the periphery of the cylinder by an arcuate gap through which a record tape is moved and within which an entire block on a record tape may be positioned, and means for effecting intermittent movement of a record tape supported by said cylinder relative to said reader unit in a direction parallel to the longitudinal axis of the tape so that the information containing blocks are read by the photosensitive devices one block at a time, said last-named means including a sprocket for engaging openings in a record tape, and drive means including a solenoid operated clutch for intermittently rotating said sprocket through a predetermined angular distance so that a record tape engaged by the sprocket is moved a distance equal to the length of an information containing block.

13. A device as defined in claim 12 wherein said arcuate gap extends through an angle of the order of one hundred and twenty degrees.

14. A device as defined in claim 12 in combination with tensioning means adapted to engage the record tape for applying a desired tension thereto in the direction of the longitudinal axis of the record tape, said tensioning means being adjustable to vary the tension applied thereby to the the tape.

15. In a record sensing device for reading blocks of information representing a complete unit of information and represented by characters arranged on a record tape in longitudinally extending columns and rows perpendicular to the columns within the blocks, a source of radiant energy, a reader unit including a plurality of radiant energy responsive devices responsive to radiant energy from said source, there being one device for each character of the block, said devices being arranged so that a plurality of said devices are in each of a plurality of rows and columns corresponding to the rows and columns within said blocks, and means for effecting intermittent relative movement between said reader unit and said tape in a manner such that the information containing blocks are successively positioned relative to the source and to said devices to be read by said reader unit one entire block at a time.

References Cited in the file of this patent

UNITED STATES PATENTS

| | | |
|---|---|---|
| 2,224,765 | Dickinson et al. | Dec. 10, 1940 |
| 2,438,825 | Roth | Mar. 30, 1948 |
| 2,724,014 | Edgar | Nov. 15, 1955 |
| 2,873,912 | Bush | Feb. 17, 1959 |
| 3,036,765 | Jones et al. | May 29, 1962 |